(12) United States Patent
Kelly

(10) Patent No.: US 7,995,282 B2
(45) Date of Patent: Aug. 9, 2011

(54) ANAMORPHIC OPTICAL SYSTEM

(75) Inventor: Shawn L. Kelly, Colorado Springs, CO (US)

(73) Assignee: Panamorph, Inc., Colorado Springs, CO (US)

( * ) Notice: Subject to any disclaimer, the term of this patent is extended or adjusted under 35 U.S.C. 154(b) by 133 days.

(21) Appl. No.: 12/635,322

(22) Filed: Dec. 10, 2009

(65) Prior Publication Data

US 2010/0321789 A1 Dec. 23, 2010

Related U.S. Application Data

(60) Provisional application No. 61/201,308, filed on Dec. 10, 2008.

(51) Int. Cl.
*G02B 13/10* (2006.01)
*G02B 5/04* (2006.01)

(52) U.S. Cl. ........ 359/669; 359/668; 359/670; 359/671; 359/737; 359/831; 359/832; 359/837

(58) Field of Classification Search .......... 359/668–671, 359/737, 831, 832, 837
See application file for complete search history.

(56) References Cited

U.S. PATENT DOCUMENTS

| | | |
|---|---|---|
| 2,307,210 A | 1/1943 | Goldsmith |
| 2,780,142 A | 2/1957 | Bouwers |
| 3,006,241 A | 10/1961 | Marks et al. |
| 3,832,046 A | 8/1974 | Mecklenborg |
| 4,017,160 A | 4/1977 | Betensky |
| 4,129,365 A | 12/1978 | Aversano et al. |
| 4,173,399 A | 11/1979 | Yevick |
| 4,327,968 A | 5/1982 | Yevick |
| 4,913,528 A | 4/1990 | Hasegawa |
| 4,953,956 A | 9/1990 | Carpenter |
| 5,159,491 A | 10/1992 | Richards |
| 5,373,395 A | 12/1994 | Adachi |
| 5,596,456 A | 1/1997 | Luecke |
| 5,610,771 A | 3/1997 | Sigler |
| 5,636,069 A | 6/1997 | Nightingale et al. |
| 5,862,001 A | 1/1999 | Sigler |
| 6,038,089 A | 3/2000 | Maruyama et al. |
| 6,128,119 A | 10/2000 | Kamikubo |
| 6,212,022 B1 * | 4/2001 | Kamikubo ............... 359/837 |
| 6,678,095 B2 | 1/2004 | Kelly |
| 6,964,484 B2 | 11/2005 | Gupta et al. |
| 7,289,272 B2 | 10/2007 | Bowron et al. |
| 7,375,868 B2 | 5/2008 | Park et al. |

* cited by examiner

*Primary Examiner* — Evelyn A. Lester
(74) *Attorney, Agent, or Firm* — Raggio & Dinnin, P.C.

(57) ABSTRACT

A pair of optical prisms arranged in a complementary relationship provides for anamorphic magnification and cooperates with a refractive or diffractive cylindrical lens element, the later of which generates an aberration that at least partially compensates an aberration generated by the pair of optical prisms. The refractive or diffractive cylindrical lens element is rotated out of normal with respect to the optic axis of the system so as to provide for reflecting stray light away from the optic axis.

30 Claims, 3 Drawing Sheets

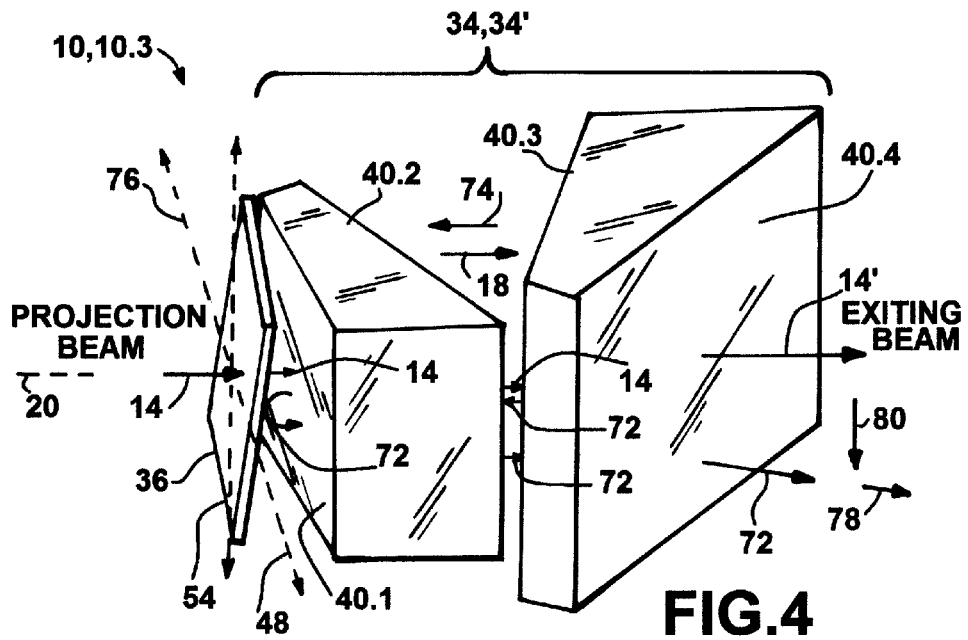
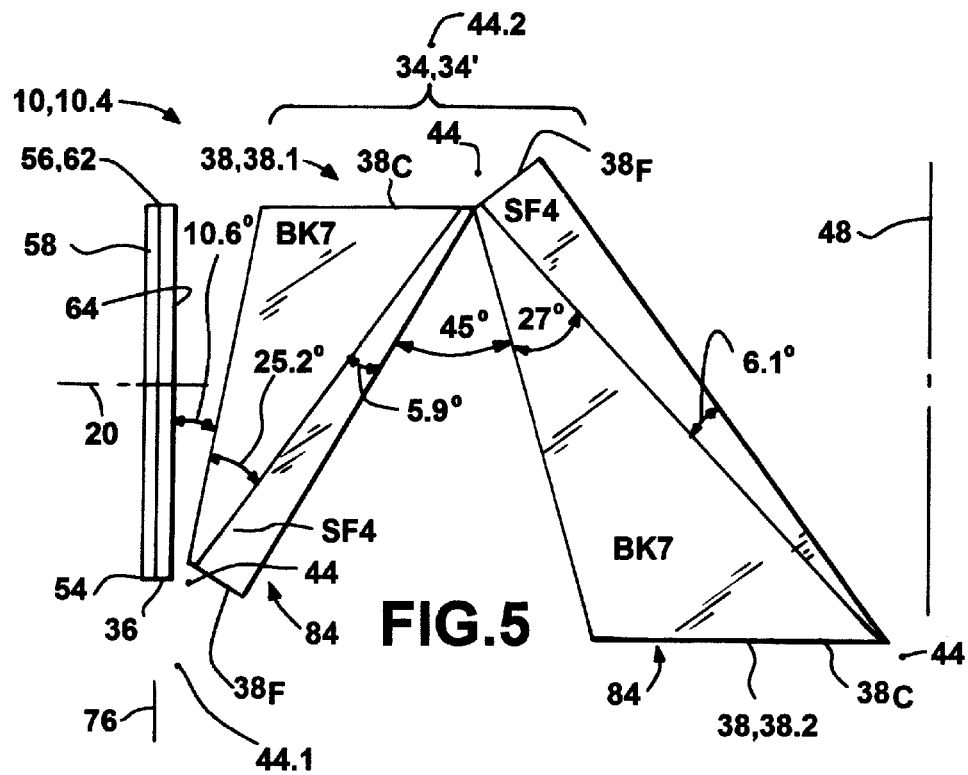

ANAMORPHIC OPTICAL SYSTEM

CROSS-REFERENCE TO RELATED APPLICATIONS

The instant application claims the benefit of prior U.S. Provisional Application Ser. No. 61/201,308 filed on Dec. 10, 2008, which is incorporated herein by reference in its entirety.

BRIEF DESCRIPTION OF THE DRAWINGS

In the accompanying drawings:

FIG. 4 illustrates an isometric view of a third embodiment of an anamorphic optical system incorporating a cylindrical corrector optic in cooperation with a pair of optical prisms, wherein the cylindrical corrector optic comprises a bent optical window; and FIG. 5 illustrates a top view of a fourth embodiment of an anamorphic optical system incorporating a cylindrical corrector optic in cooperation with a pair of optical prisms, wherein the cylindrical corrector optic comprises a bent optical window.

DESCRIPTION OF EMBODIMENT(S)

Figure 1:
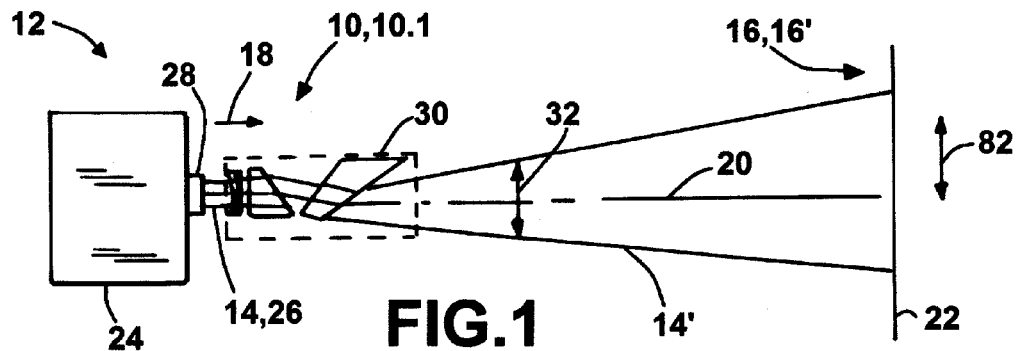
FIG. 1 illustrates an anamorphic optical system incorporated in an imaging system being used to anamorphically magnify an image projected onto a screen by an associated image projector.

Referring to FIG. 1, an anamorphic optical system 10 is incorporated in an image projection system 12 so as to provide for anamorphically magnifying light 14 of an image 16 projected in a first direction 18 along an associated optic axis 20 onto a screen 22 by an associated image projector 24.

An anamorphic optical system 10 provides for different magnifications in different orthogonal directions normal to an optic axis 20. Anamorphic lenses have been most commonly used in the film industry to either compress a wide-field image into a more square frame during filming or to decompress the developed film frame upon projection. More recently, anamorphic lenses have been used in the home theater industry to reformat the more square, 4:3 aspect ratio of the common front-projected image into a 16:9 aspect ratio to take advantage of anamorphically compressed DVD movies. By using all the pixels of the 4:3 projector to show a 16:9 image, the image is both brighter and higher resolution than that provided by the conventional letter box format where pixels at the top and bottom of the image are unused.

For example, in one embodiment, an electronic image projector 24 generates and projects a plurality of modulated beams of light 26 through an associated projection lens 28, each beam of light 26 of a different primary color so as to provide for projecting a white-light image 16' on the screen 22. Alternatively, a film-based image projector 24 could be used to generate and project the light 16 of the image 14. The anamorphic optical system 10 may be incorporated in a housing 30 that is attached to either the image projector 24 or the projection lens 28 thereof. Alternatively, the anamorphic optical system 10 could be either free-standing or incorporated in the image projector 24 either ahead of or behind the projection lens 28. As illustrated in FIG. 1, the size (i.e. transverse extent) of the image 16 is substantially larger than the size (i.e. transverse extent) of the projection lens 28.

Anamorphic optical systems are known to operate with least aberration in an afocal arrangement, wherein the light 14 propagating therethrough is collimated. For example, collimation optics may be used before and/or after the anamorphic optical system 10 so as to provide for this condition. This collimation condition is approximated in some applications such as home theater environments in which the projected image is substantially distant from the projection lens 28 and the aperture of the projection lens 28 is very small relative to this distance. However, even slight deviations from ideal collimation can create astigmatic focus aberrations in the image 16 for an anamorphic optical system that does not otherwise provide for compensation thereof. FIG. 1 illustrates a condition for which the transverse extent 32 of the light 14 projected by the image projector 24 expands with distance from the image projector 24 as the light 14 is projected through the anamorphic optical system 10, the latter of which is located at a substantial distance from the screen 22.

Referring to FIGS. 2a-b, 3a-b, 4 and 5, the anamorphic optical system 10 comprises an anamorphic optical subsystem 34 in series with corrector optics 36. For example, an anamorphic optical subsystem 34 may comprise a prismatic anamorphic optical subsystem 34' comprising at least one optical prism 38. For example, prismatic anamorphic optical subsystems 34' are described in *Modern Optical Engineering* by Warren J. Smith, McGraw-Hill, 1966, pages 239-241, which is incorporated herein by reference. Depending upon the shape of the optical prism 38, and the orientation thereof relative to the associated optic axis 20 along which light 14 is incident thereupon, the optical prism 38, can either expand or compress the size of a beam or image 16 associated with the incident light 14. For example, the anamorphic optical subsystems 34 illustrated in FIGS. 2a-b, 3a-b, 4 and 5 are each configured to provide for expanding the associated beam or image 16 associated with the light 14 incident thereupon. Whereas a single optical prism 38 provides for both anamorphic magnification and redirection of the beam or image 16 associated with the incident light 14, a pair of optical prisms 38, 38.1, 38.2 in complementary orientation can provide for anamorphic magnification without redirecting the beam or image 16 associated with the incident light 14.

More particularly, the pair of optical prisms 38 comprise first 38.1 and second 38.2 optical prisms. The first optical prism 38.1 comprises first 40.1 and second 40.2 optical surfaces with at least one optical medium 42 therebetween, wherein a first plane 40.1' underlying the first optical surface 40.1 intersects with a second plane 40.2' underlying the second optical surface 40.2 at a first apex 44.1. Similarly, the second optical prism 38.2 comprises third 40.3 and fourth 40.4 optical surfaces with at least one optical medium 42 therebetween, wherein a third plane 40.3' underlying the third optical surface 40.3 intersects with a fourth plane 40.4' underlying the fourth optical surface 40.4 at a second apex 44.2. For example, in one embodiment the first 40.1', second 40.2', third 40.3' and fourth 40.4' planes and the first 44.1 and second 44.2 apexes are each substantially perpendicular to a common reference plane 46.

The first 38.1 and second 38.2 optical prisms in combination provide for anamorphic magnification of an image 16 associated with light 14 thereof that is incident upon and passes therethrough, wherein the anamorphic magnification is along an effective axis of anamorphic magnification 48.

The optic axis 20 of the anamorphic optical system 10 extends across and through the first 38.1 and second 38.2 optical prisms and the associated optical surfaces 40.1, 40.2, 40.3, 40.4 thereof, between the first 44.1 and second 44.2 apexes of the first 38.1 and second 38.2 optical prisms that are in complementary relationship with one another so that a relatively thinner portion 50 of the first optical prism 38.1 and a relatively thicker portion 52 of the second optical prism 38.2 are both on one side of the optic axis 20 along the associated effective axis of anamorphic magnification 48 of the anamorphic optical system 10, and a relatively thicker portion 52 of the of the first optical prism 38.1 and a relatively thinner portion 50 of the second optical prism 38.2 are on a diametrically opposed side of the optic axis 20 along the associated effective axis of anamorphic magnification 48. Accordingly, the complementary arrangement of the first 38.1 and second 38.2 optical prisms provides for anamorphic magnification by the anamorphic optical subsystem 34 without substantially redirecting the associated optic axis 20, so as to provide for using the anamorphic optical system 10 with an existing image projection system 12 without requiring substantial realignment thereof.

A prismatic anamorphic optical subsystem 34' naturally produces the optical aberration of astigmatism in projection applications, particularly if the associated light 14 is not collimated. Accordingly, the first 38.1 and second 38.2 optical prisms in combination generate at least one first aberration in the light 14 of the image 16. In addition to astigmatism, other examples of possible first aberrations include residual aberrations such as focus and/or chromatic aberrations. In accordance with the teachings of U.S. Pat. No. 6,678,095, which is incorporated herein by reference, the corrector optics 36 of the anamorphic optical system 10 comprise at least one refractive or diffractive element 54 operatively associated with the first 38.1 and second 38.2 optical prisms that generates at least on second aberration in the light 14 of the image 16 that provides for at least partially compensating for the at least one first aberration, so as to reduce the amount of aberration in the light 14' exiting the anamorphic optical system 10.

Figure 2A:
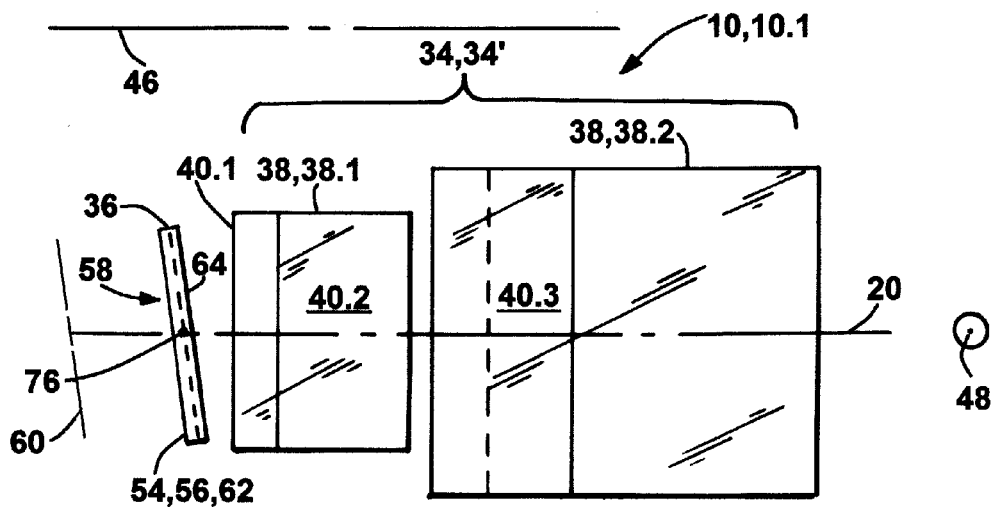
FIGS. 2a and 2b respectively illustrate side and top orthographic views of a first embodiment of an anamorphic optical system incorporating a plano-concave cylindrical corrector optic in cooperation with a pair of optical prisms.
Figure 2B:
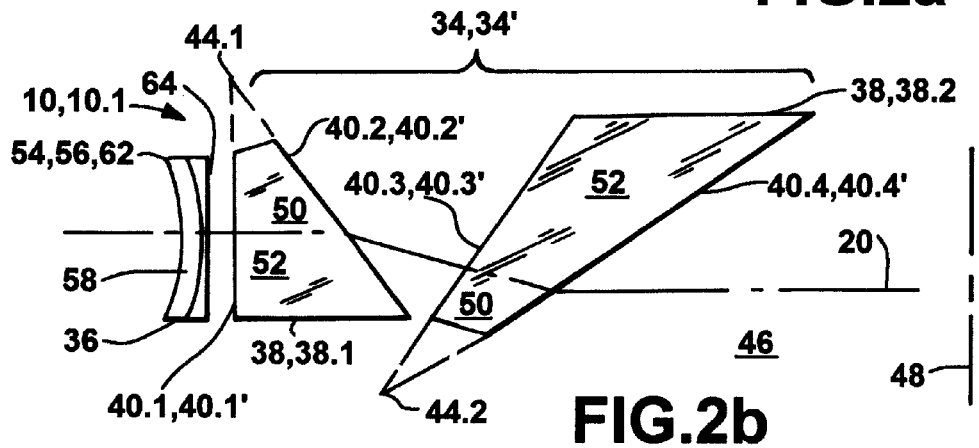

For example, referring to FIGS. 1, 2a and 2b, in accordance with a first embodiment of an anamorphic optical system 10.1, with the first 38.1 and second 38.2 optical prisms configured to provide for expanding the image 16 along the effective axis of anamorphic magnification 48, the associated at least one refractive or diffractive element 54 comprises a cylindrical lens 56, for example, comprising at least one concave optical surface 58 with associated negative optical power, wherein an associated axis of cylindrical curvature 60 is substantially perpendicular to the effective axis of anamorphic magnification 48. For example, FIGS. 1, 2a and 2b illustrate a plano-concave lens 62 used as the corrector optics 36, comprising a concave optical surface 58 and a planar optical surface 64 on opposing sides thereof, wherein which side is which relative to the direction of light 14 therethrough is not limiting. The curvature of the concave optical surface 58 of the cylindrical lens 56 of the corrector optics 36 illustrated in FIGS. 1, 2a and 2b is exaggerated for purposes of illustration.

Figure 3A:
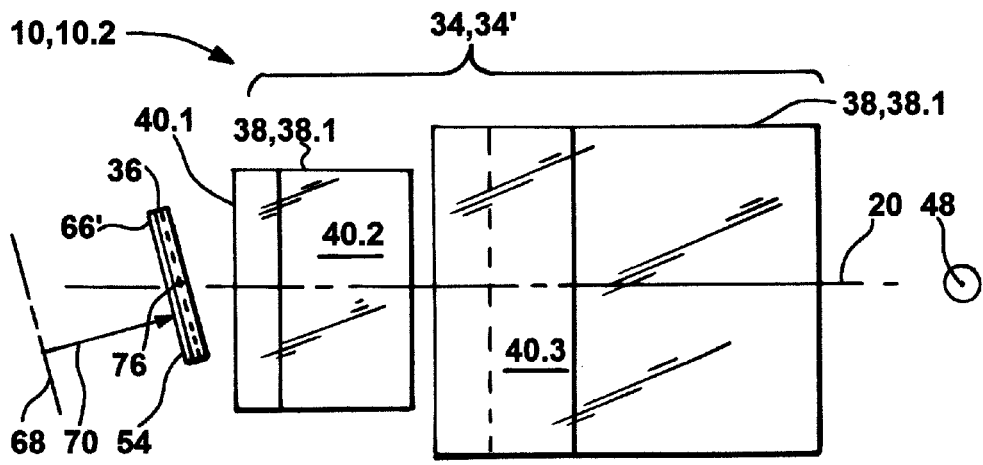
FIGS. 3a and 3b respectively illustrate side and top orthographic views of a second embodiment of an anamorphic optical system incorporating a cylindrical corrector optic in cooperation with a pair of optical prisms, wherein the cylindrical corrector optic comprises a optical window.
Figure 3B:
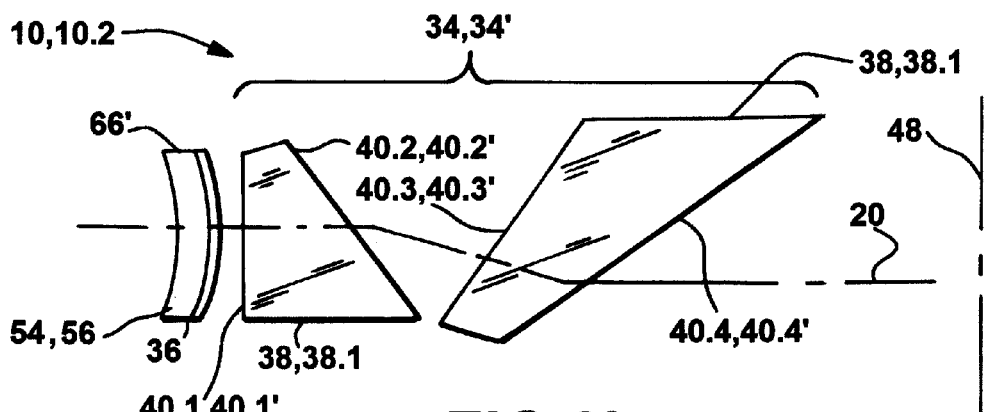

Referring to FIGS. 3a and 3b, in accordance with a second embodiment of an anamorphic optical system 10.2, the corrector optics 36 may alternatively comprise a cylindrical lens 56 having an associated axis of cylindrical curvature 60, formed by bending a flat sheet of optical material 66, for example, an optical window 66', for example, made of plastic or glass, around a bending axis 68 into an associated cylindrical radius 70, for example, by forces applied at the edges of the optical window 66', for example, as disclosed in U.S. Pat. No. 6,678,095 in FIGS. 3, 5 and 6, and on col. 4 at lines 12-44 and on col. 5, line 18 through col. 6, line 4, all of which is incorporated herein by reference. When a flat sheet of optical material 66 is bent, the two surfaces do not maintain a perfect parallel relationship and the respective radii of the surfaces therefore become slightly different, with the bent optical window 66' becoming relatively thinner at the center relative to the edges, so as to induce a slight negative optical power. This can be adjusted by varying the amount of bending, as disclosed in U.S. Pat. No. 6,678,095 incorporated herein by reference, so as to provide for adjusting the focal length of the light 14' exiting the anamorphic optical system 10, which provides for accommodating a change in distance from the anamorphic optical system 10 to the screen 22 by altering the amount of curvature of the optical window 66' in combination with a minor focus adjustment of the projection lens 28.

Alternatively, the at least one refractive or diffractive element 54 of the corrector optics 36 could comprise a diffractive optical element, for example, a holographic optical lens of comparable optical properties to the refractive cylindrical lenses 56 described and illustrated hereinabove.

Referring to FIG. 4, in accordance with a third embodiment of an anamorphic optical system 10.3, the anamorphic optical system 10 may be subject to stray light 72 propagating in a second direction 74 having a component that is opposite to the first direction 18 of light 14, 14' entering and exiting the anamorphic optical system 10. The stray light 72 propagating in the second direction 74 eventually reaches the at least one refractive or diffractive element 54 of the corrector optics 36, which is rotated so as to be out of normal with respect to the optic axis 20 of the anamorphic optical system 10, so as to provide for reflecting the stray light 72 away from the optic axis 20, which provides for reflecting the stray light 72 away from the area of the image 16 on the screen 22, which provides for improving the contrast between the light and dark regions in the image 16. Generally, the rotation of the at least one refractive or diffractive element 54 of the corrector optics 36 may be about any axis orthogonal to the incoming light 14 along the optic axis 20. However, the particular axis 76 about which the at least one refractive or diffractive element 54 of the corrector optics 36 is rotated may affect the ability of the corrector optics 36 to compensate for the at least one first aberration caused by the anamorphic optical subsystem 34. In one embodiment, the at least one refractive or diffractive element 54 of the corrector optics 36 is rotated about an axis 76 that is substantially parallel to the effective axis of anamorphic magnification 48, and substantially orthogonal to the axis of cylindrical curvature 60 of the at least one refractive or diffractive element 54 of the corrector optics 36. This provides for minimizing the associated angle of rotation necessary to reduce reflections of stray light 72 from reaching the image 16 if the projected image is anamorphically expanded horizontally so that the width of the resulting image 16 is wider than it is high, because the amount of angle of the at least one refractive or diffractive element 54 of the corrector optics 36 necessary to direct reflections outside the image 16 is less in the direction of minimum image dimension.

Accordingly, stray light 72 is reflected from the at least one refractive or diffractive element 54 of the corrector optics 36 in a third direction 78 that is oblique to the first direction 18 so that the stray light 72 reflected from the at least one refractive or diffractive element 54 is substantially displaced from the image 16 at the screen 22, or absorbed by the elements of the anamorphic optical system 10. In one embodiment, a component 80 of the third direction 78 transverse to the optic axis 20 is substantially orthogonal to the effective axis of anamorphic magnification 48.

Otherwise, light reflected back into the projection lens from optical elements in and anamorphic optical system without a rotated corrector optics 36 could be re-reflected by surfaces and features in the image projector 24, associated projection lens 28 and the corrector optics 36 themselves so as to pass through the anamorphic optical subsystem 34 onto the image 16, which would significantly degrade this contrast. Generally, the surfaces of the optical prisms 38, 38.1, 38.2 of a prismatic anamorphic optical subsystem 34' tend to naturally be at angles to the incident light 14 so that residual reflections from those surfaces would not re-enter the projection lens 28 where it could be subsequently be reflected or scattered back out into the image 16. However, with the corrector optics 36 being added to compensate for focus or astigmatism aberrations not treated by or integrated with the optical prisms 38, 38.1, 38.2 themselves, if the corrector optics 36 were substantially orthogonal to the optic axis 20 and the associated light 14 from the image projector 24, such unwanted reflections might otherwise occur.

Accordingly, rotating the at least one refractive or diffractive element 54 of the corrector optics 36 substantially prevents stray light 72 from entering the projection lens 28 for subsequent re-reflection into the projected image 16. For example, in one embodiment, a rotation of the at least one refractive or diffractive element 54 of the corrector optics 36 by approximately 10 degrees off normal was sufficient to prevent stray light 72 from entering the projection lens 28 and from being reflected back therefrom in such a way as to eventually arrive at the image 16. Such a small angle has a very minimal, almost imperceptible impact on the quality of the image 16 relative to an otherwise optimal quality had the at least one refractive or diffractive element 54 of the corrector optics 36 been otherwise oriented orthogonal to the incoming light 14 along the optic axis 20.

Referring again to FIG. 1, the first 38.1 and second 38.2 optical prisms are each shaped and are each oriented relative to the optic axis 20 so as to provide for expanding the image 16 along the effective axis of anamorphic magnification 48 relative to a direction that is transverse to the effective axis of anamorphic magnification 48 and to the optic axis 20, wherein the effective axis of anamorphic magnification 48 is substantially oriented in a horizontal direction 82.

Generally, the corrector optics 36 may be placed anywhere in the optical path, either ahead of or after the anamorphic optical subsystem 34. However, if the light 14 entering the anamorphic optical system 10 exhibits angular field properties rather than being unidirectional, the arrangement illustrated in FIGS. 1-5 with the corrector optics 36 ahead of the anamorphic optical subsystem 34 would generally require smaller corrector optics 36 than if the corrector optics 36 were located after the anamorphic optical subsystem 34 where the light 14' exiting therefrom to be significantly diverged. For example, with the light 14 entering the anamorphic optical subsystem 34 after passing through the corrector optics 36, the corrector optics 36 acts to pre-aberrate the light 14 entering the anamorphic optical subsystem 34 so as to reduce the resulting net aberrations in the light 14' exiting the anamorphic optical system 10.

Referring to FIG. 5, in accordance with a fourth embodiment of an anamorphic optical system 10.4, the first 38.1 and second 38.2 optical prisms may be adapted to at least partially compensate for chromatic aberration in the image 16 by incorporating a plurality of first prisms 38.1 and a plurality of second prisms 38.2, each incorporating a plurality of different optical media 42. More particularly, the embodiment illustrated in FIG. 5 incorporates two achromatic optical prism pairs 84, each of which incorporates two associated optical prism elements $38_C$, $38_F$, one optical prism element $38_C$ constructed of standard BK7 crown glass, the other optical prism element $38_F$ constructed of standard SF4 flint glass, wherein the separate optical prism elements $38_C$, $38_F$ of each achromatic optical prism pairs 84 are in complementary relationship with one another, i.e. with the associated apexes 44 on opposite sides of the associated optic axis 20, the optical prism elements $38_C$ constructed crown glass of the different achromatic optical prism pairs 84 are in complementary relationship, so that the optical prism elements $38_F$ constructed of flint glass of the different achromatic optical prism pairs 84 are also in complementary relationship. FIG. 5 also lists the associated angles between the various surfaces of the anamorphic optical system 10.4, wherein the angles are given in degrees. The associated anamorphic optical subsystem 34 provides for a nominal 1.35 power magnification of the image along the effective axis of anamorphic magnification 48, which in the image projection system 12 illustrated in FIG. 1 is in the horizontal direction 82. The associated angles were optimized with optical design software using an associated merit function designed to produced the smallest average polychromatic spot size over the simulated full field/image size of the image projector 24. The associated at least one refractive or diffractive element 54 of the corrector optics 36 comprises a plano-concave lens 62 constructed of standard BK7 crown glass. For orthogonal incidence light 14 and a distance of approximately 16 feet from the image projector 24 to the screen 22, the cylindrical curvature of the concave optical surface 58 of the plano-concave lens 62 was determined to have an associated cylindrical radius 70 of about 17.4 feet. With the at least one refractive or diffractive element 54 of the corrector optics 36 rotated around an axis 76 parallel to the effective axis of anamorphic magnification 48 then the optimum cylindrical radius 70 of the corrector optics 36 does not change substantially, but the merit function improves a small amount at a tilt of approximately seven degrees, which is sufficient for retroreflecting stray light 72 propagating through the anamorphic optical system 10.4 to be diverted away from the screen 22 in most practical image projection applications.

Generally, the anamorphic optical system 10 with a cylindrical lens 56 corrector optics 36—and also generally for other corrector optics 36 arrangements—benefits from a specific focal length of the light 14 incident thereupon to provide a given focal length of the light 14' exiting the anamorphic optical system 10 with best focus. The particular parameters are readily generated through the use of conventional optical design software and algorithms known to those of ordinary skill in the art. The curvature of the cylindrical lens 56 corrector optics 36 depends upon the nature of the associated aberration to be corrected. Moreover, the associated radius of curvature is not necessarily constant, but may depend upon the particular operating condition.

The optical prisms 38 used in the anamorphic optical system 10 may be constructed of either solid optical medium 42, or of hollow optical elements filled with a liquid optical medium 42, for example, as disclosed in U.S. Pat. No. 6,678,095, which is incorporated herein by reference.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein the expression "A or B" is true if either A or B is true, or if both A and B are true. Accordingly, the particular arrangements disclosed are meant to be illustrative only and not limiting as to the scope of the invention, which is to be given the full breadth of any claims that are supported by the above description and drawings, and any and all equivalents thereof.

What is claimed is:

1. A method of anamorphically magnifying an image, comprising:
    a. projecting light of an image generally along an optic axis in a first direction through at least one refractive or diffractive element;
    b. projecting said light of said image generally along said optic axis in said first direction through at least one first optical prism;
    c. projecting said light of said image generally along said optic axis in said first direction through at least one second optical prism, wherein said at least one first optical prism in combination with said at least one second optical prism provides for anamorphic magnification of said light of said image along an effective axis of anamorphic magnification, and said at least one first optical prism and said at least one second optical prism in combination generate at least one first aberration in said light of said image;
    d. forming an anamorphically magnified image from said light of said image after the operations of projecting said light through said at least one refractive or diffractive element, projecting said light through said at least one first optical prism, and projecting said light thorough said at least one second optical prism;
    e. propagating stray light in a second direction, wherein said second direction has a component opposite to said first direction; and
    f. reflecting said stray light from said at least one refractive or diffractive element in a third direction and orienting said at least one refractive or diffractive element so that said third direction is oblique to said first direction so that said stray light reflected from said at least one refractive or diffractive element is substantially displaced from said image, wherein the operation of projecting said light of said image through said at least one refractive or diffractive element comprises aberrating said light of said image with at least one second aberration that at least partially compensates for at least one of said at least one first aberration.

2. A method of anamorphically magnifying an image as recited in claim 1, wherein a component of said third direction transverse to said optic axis is substantially orthogonal to said effective axis of anamorphic magnification.

3. A method of anamorphically magnifying an image as recited in claim 1, wherein said at least one refractive or diffractive element comprises a cylindrical lens.

4. A method of anamorphically magnifying an image as recited in claim 3, wherein said cylindrical lens comprises at least one concave optical surface.

5. A method of anamorphically magnifying an image as recited in claim 4, wherein said cylindrical lens comprises at least one planar optical surface.

6. A method of anamorphically magnifying an image as recited in claim 3, further comprising bending a flat sheet of optical material around a bending axis so as to form said cylindrical lens having an associated axis of cylindrical curvature parallel to said bending axis.

7. A method of anamorphically magnifying an image as recited in claim 3, wherein an axis of cylindrical curvature of said cylindrical lens is substantially perpendicular to said effective axis of anamorphic magnification.

8. A method of anamorphically magnifying an image as recited in claim 1, wherein the operation of projecting said light of said image through said at least one refractive or diffractive element occurs prior to both the operation of projecting said light of said image through said at least one first optical prism and the operation of projecting said light of said image through said at least one second optical prism.

9. A method of anamorphically magnifying an image as recited in claim 1, wherein said at least one first optical prism comprises a plurality of first optical prisms abutting one another and constructed of at least two different optical materials, wherein said plurality of first optical prisms abutting one another and constructed of said at least two different optical materials provide for at least partially compensating for chromatic aberration in said image.

10. A method of anamorphically magnifying an image as recited in claim 9, wherein said at least one second optical prism comprises a plurality of second optical prisms abutting one another and constructed of at least two different optical materials, wherein said plurality of second optical prisms abutting one another and constructed of said at least two different optical materials provide for at least partially compensating for said chromatic aberration in said image.

11. A method of anamorphically magnifying an image as recited in claim 1, wherein said at least one first aberration comprises astigmatism.

12. A method of anamorphically magnifying an image as recited in claim 1, wherein the operation of forming said anamorphically magnified image from said light of said image comprises expanding said image along said effective axis of anamorphic magnification relative to a direction that is transverse to said effective axis of anamorphic magnification and to said optic axis.

13. A method of anamorphically magnifying an image as recited in claim 1, wherein the operation of orienting said at least one refractive or diffractive element comprises rotating said at least one refractive or diffractive element about an axis, wherein said axis is substantially parallel to said effective axis of anamorphic magnification.

14. An anamorphic optical system, comprising:
    a. at least one first optical prism, wherein said at least one first optical prism comprises a first optical surface and a second optical surface, a first plane underlying said first optical surface intersects with a second plane underlying said second optical surface along a first apex, an optic axis of the anamorphic optical system extends across and through said at least one first optical prism and through said first and second optical surfaces thereof;
    b. at least one second optical prism, wherein said at least one second optical prism comprises a third optical surface and a fourth optical surface, a third plane underlying said third optical surface intersects with a fourth plane underlying said fourth optical surface along a second apex, said optic axis of said anamorphic optical system extends across and through said at least one second optical prism and through said third and fourth optical surfaces thereof, said optic axis of said anamorphic optical system is located between said first and second apexes, said at least one first and at least one second optical prisms in combination provide for anamorphic magnification of an image associated with light thereof that is incident upon and passes through said at least one first and at least one second optical prisms, wherein said anamorphic magnification is along an effective axis of anamorphic magnification, and said at least one first and at least one second optical prisms in combination generate at least one first aberration in said light of said image; and c. at least one refractive or diffractive element operatively associated with said at least one first and at least one second optical prisms, wherein said at least one refractive or diffractive element generates at least one second aberration in said light of said image that at least partially compensates for at least one of said at least one first aberration when said light of said image passes through said at least one first optical prism, said at least one second optical prism and said at least one refractive or diffractive element, and said at least one refractive or diffractive element is rotated so as to be out of normal with respect to said optic axis.

15. An anamorphic optical system as recited in claim 14, wherein the rotation of said at least one refractive or diffractive element provides for reflecting, in a direction away from said optic axis, at least a portion of stray light propagating within the anamorphic optical system in a direction counter to said light of said image.

16. An anamorphic optical system as recited in claim 14, wherein the rotation of said at least one refractive or diffractive element is about an axis that is substantially parallel to said effective axis of anamorphic magnification.

17. An anamorphic optical system as recited in claim 14, wherein said at least one first optical prism comprises a plurality of first optical prisms abutting one another and constructed of at least two different optical materials, wherein said plurality of first optical prisms abutting one another and constructed of said at least two different optical materials provide for at least partially compensating for chromatic aberration in said image.

18. An anamorphic optical system as recited in claim 17, wherein said at least one second optical prism comprises a plurality of second optical prisms abutting one another and constructed of at least two different optical materials, wherein said plurality of second optical prisms abutting one another and constructed of said at least two different optical materials provide for at least partially compensating for said chromatic aberration in said image.

19. An anamorphic optical system as recited in claim 14, wherein said at least one first optical prism and said at least one second optical prism are each shaped and are each oriented relative to said optic axis so as to provide for expanding said image along said effective axis of anamorphic magnification relative to a direction that is transverse to said effective axis of anamorphic magnification and to said optic axis.

20. An anamorphic optical system as recited in claim 14, wherein said at least one first aberration comprises astigmatism.

21. An anamorphic optical system as recited in claim 14, wherein said first, second, third and fourth planes and said first and second apexes are each substantially perpendicular to a common reference plane.

22. An anamorphic optical system as recited in claim 14, wherein said at least one refractive or diffractive element comprises a cylindrical lens.

23. An anamorphic optical system as recited in claim 22, wherein said cylindrical lens comprises at least one concave optical surface.

24. An anamorphic optical system as recited in claim 23, wherein said cylindrical lens comprises at least one planar optical surface.

25. An anamorphic optical system as recited in claim 22, wherein said cylindrical lens comprises a flat sheet of optical material bent around a bending axis so as to form said cylindrical lens having an associated axis of cylindrical curvature parallel to said bending axis.

26. An anamorphic optical system as recited in claim 22, wherein an axis of cylindrical curvature of said cylindrical lens is substantially perpendicular to said effective axis of anamorphic magnification.

27. An anamorphic optical system as recited in claim 14, wherein said at least one refractive or diffractive element is located along said optic axis ahead of said at least one first optical prism and ahead of said at least one second optical prism relative to said image.

28. An anamorphic optical system as recited in claim 14, wherein said at least one refractive or diffractive element, said at least one first optical prism and said at least one second optical prism are used in cooperation with an image projection system, further comprising an image projector, wherein said image projector provides for generating and projecting said light of said image along said optic axis towards said at least one refractive or diffractive element, towards said at least one first optical prism, and towards said at least one second optical prism, and a transverse extent of said light projected by said image projector expands with distance from said image projector.

29. An anamorphic optical system as recited in claim 28, wherein said at least one first optical prism and said at least one second optical prism are each shaped and are each oriented relative to said optic axis so as to provide for expanding said image along said effective axis of anamorphic magnification relative to a direction that is transverse to said effective axis of anamorphic magnification and to said optic axis, and said effective axis of anamorphic magnification is substantially oriented in a horizontal direction.

30. An anamorphic optical system as recited in claim 28, further comprising a screen, wherein said screen is located a substantial distance from said at least one refractive or diffractive element, said at least one first optical prism and said at least one second optical prism, and an anamorphically magnified said image is focused on said screen.

* * * * *